United States Patent
Patel et al.

(10) Patent No.: US 8,503,300 B2
(45) Date of Patent: Aug. 6, 2013

(54) EFFICIENT MESSAGING OVER INTERNET PROTOCOL

(75) Inventors: Biren Patel, San Ramon, CA (US); Jerry Kupsh, Concord, CA (US); Sanjeevan Sivalingham, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 12/253,397

(22) Filed: Oct. 17, 2008

(65) Prior Publication Data

US 2010/0099421 A1 Apr. 22, 2010

(51) Int. Cl.
*G01R 31/08* (2006.01)
(52) U.S. Cl.
USPC ........... 370/235; 370/236; 370/242; 370/248; 370/252
(58) Field of Classification Search
USPC .......................................... 370/242, 248, 252
See application file for complete search history.

(56) References Cited

U.S. PATENT DOCUMENTS

| | | | | |
|---|---|---|---|---|
| 6,253,079 B1 * | 6/2001 | Valentine et al. | ............. | 455/428 |
| 6,438,603 B1 * | 8/2002 | Ogus | ............................. | 709/233 |
| 6,718,173 B1 * | 4/2004 | Somani et al. | ............. | 455/456.1 |
| 6,958,997 B1 * | 10/2005 | Bolton | ........................... | 370/392 |
| 7,020,713 B1 * | 3/2006 | Shah et al. | .................... | 709/235 |
| 7,046,680 B1 * | 5/2006 | McDysan et al. | ............. | 370/396 |
| 7,151,746 B2 * | 12/2006 | Hiroki | .......................... | 370/230 |
| 7,236,764 B2 * | 6/2007 | Zhang et al. | .................. | 455/346 |
| 7,319,666 B2 * | 1/2008 | Goosman | ...................... | 370/230 |
| 7,327,683 B2 * | 2/2008 | Ogier et al. | ................... | 370/236 |
| 7,333,460 B2 * | 2/2008 | Vaisanen et al. | .............. | 370/338 |
| 7,356,339 B2 * | 4/2008 | Nam | ............................. | 455/436 |
| 7,483,374 B2 * | 1/2009 | Nilakantan et al. | ........... | 370/235 |
| 7,499,458 B2 * | 3/2009 | McDysan et al. | ............. | 370/396 |
| 7,602,730 B1 * | 10/2009 | Hou | ............................. | 370/252 |
| 7,616,659 B2 * | 11/2009 | Benedyk et al. | ............. | 370/467 |
| 7,724,670 B2 * | 5/2010 | Nilakantan et al. | ........... | 370/235 |
| 7,747,247 B2 * | 6/2010 | Abdel-Kader | ................ | 455/421 |
| 7,751,807 B2 * | 7/2010 | Lin et al. | ....................... | 455/418 |
| 7,920,856 B2 * | 4/2011 | Lin et al. | ....................... | 455/418 |
| 7,957,318 B1 * | 6/2011 | Hou | .............................. | 370/252 |
| 2002/0186680 A1 * | 12/2002 | Takagi et al. | ................. | 370/349 |
| 2003/0147411 A1 * | 8/2003 | Goosman | ...................... | 370/412 |
| 2003/0179742 A1 * | 9/2003 | Ogier et al. | ................... | 370/351 |
| 2005/0091396 A1 * | 4/2005 | Nilakantan et al. | ........... | 709/232 |
| 2005/0117576 A1 * | 6/2005 | McDysan et al. | ............. | 370/389 |
| 2005/0138428 A1 * | 6/2005 | McAllen et al. | .............. | 713/201 |
| 2005/0163155 A1 * | 7/2005 | Yang et al. | .................... | 370/465 |
| 2005/0220035 A1 * | 10/2005 | Ling et al. | ..................... | 370/252 |
| 2006/0077988 A1 * | 4/2006 | Cheng et al. | ................... | 370/401 |
| 2007/0248056 A1 * | 10/2007 | Feng et al. | ..................... | 370/331 |
| 2007/0280228 A1 * | 12/2007 | Tanimoto et al. | ............. | 370/389 |
| 2008/0016566 A1 * | 1/2008 | Raz | .................................. | 726/22 |
| 2008/0137823 A1 * | 6/2008 | Abichandani et al. | ... | 379/106.01 |
| 2008/0160984 A1 * | 7/2008 | Benes et al. | .................. | 455/419 |
| 2008/0198841 A1 * | 8/2008 | Desorbay et al. | ............. | 370/352 |
| 2008/0242373 A1 * | 10/2008 | Lu et al. | ....................... | 455/575.1 |
| 2009/0052320 A1 * | 2/2009 | Ling et al. | ..................... | 370/231 |
| 2009/0077184 A1 * | 3/2009 | Brewer et al. | ................. | 709/206 |

(Continued)

*Primary Examiner* — Jay P Patel

(57) ABSTRACT

A method for a client and server based messaging system efficiently exchanges messages over an IP connection in a wireless network. Also included is an automated method by which a messaging client can request intelligent and efficient presence updates from the wireless network by utilizing timers and adapt such timers based on load conditions in the wireless network.

17 Claims, 9 Drawing Sheets

(56) References Cited

U.S. PATENT DOCUMENTS

| | | |
|---|---|---|
| 2009/0112742 A1* | 4/2009 | Sumino et al. .................. 705/30 |
| 2009/0132723 A1* | 5/2009 | Schneider .................... 709/237 |
| 2009/0175165 A1* | 7/2009 | Leighton ...................... 370/221 |
| 2009/0204696 A1* | 8/2009 | Zhang et al. .................. 709/223 |
| 2009/0240824 A1* | 9/2009 | Rekhtman .................... 709/230 |
| 2010/0279733 A1* | 11/2010 | Karsten et al. ............. 455/552.1 |

* cited by examiner

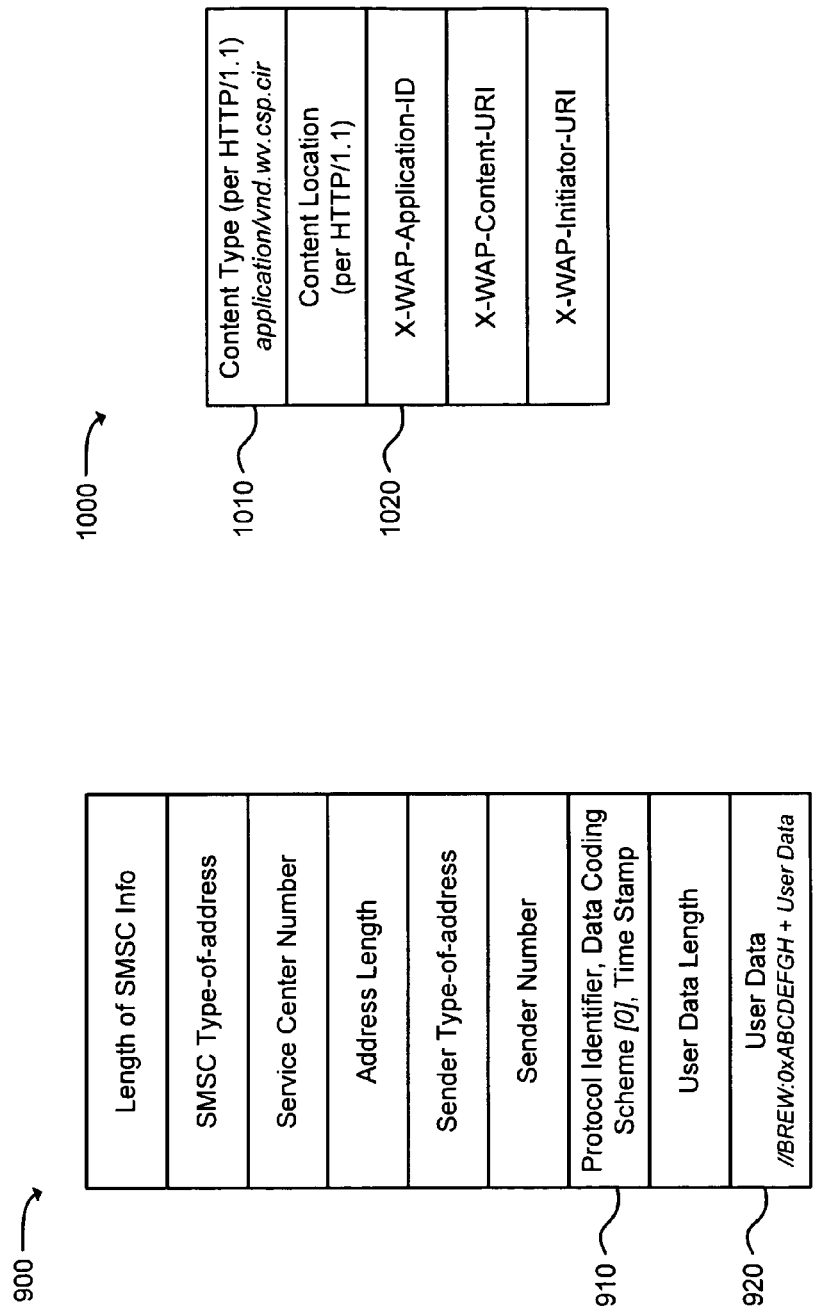

EFFICIENT MESSAGING OVER INTERNET PROTOCOL

BACKGROUND INFORMATION

Wireless subscribers expect access to TCP/IP (Transmission Control Protocol/Internet Protocol)-based applications from their mobile phones. However, these applications must be adapted to overcome resource limitations and security restrictions typical to wireless networks in order to make them viable. For example, a server in the network may not be permitted to establish a connection to a client on a mobile handset to limit unsolicited data traffic. Also, the wireless network may assign a different IP address to a mobile device for different data sessions, making it unfeasible for a network server to initiate a connection.

The number of IP addresses available in the network to be allocated to a mobile device is generally less than the total number of mobile customers. As a result, the wireless network may not allocate a dedicated IP address to a mobile device. The address allocated to the mobile device may change from a data session to another data session. This imposes a technical challenge for a messaging server to reach a mobile device using its IP address.

During a TCP/IP-based application session, the data exchange between a mobile application client operating on a mobile device and an associated server in a wireless network may include bursts of high activity with large idle periods. This bursty nature may be seen in IP messaging services, such as text and picture message exchanges. After the initial exchanges, either the client or the server could have data to exchange following an idle period where, unknown to the client or the server, the TCP connection may have been terminated somewhere along the wireless network.

BRIEF DESCRIPTION OF THE DRAWINGS

FIG. 9 is an exemplary data structure for a short messaging service (SMS) wake-up message; and FIG. 10 is an exemplary data structure for a wireless application protocol (WAP) push wakeup message.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide for efficient use of TCP/IP-based applications for mobile devices. In one implementation, a client and server based messaging system may use timers to detect an extended idle period over an existing TCP connection and automatically close the connection. A server may use a "wakeup" message to effectively enable a server-initiated TCP/IP connection in a limited connectivity (e.g., not always on) wireless network. In another implementation, dynamic refresh timers may be used to vary the frequency of automatic presence updates based on current load conditions to optimize use of network resources.

As used herein, the term "IP messaging" may refer to real-time or near real-time communication between two or more people based on typed text, audio files, still image files, video files, and/or other multimedia content that may be conveyed via computing devices over an IP network. As used herein, the term "client" may be used to refer to an IP messaging application operating on a mobile device, and the term mobile device may refer generally to either the mobile device or the client running on the mobile device. Also, the terms "mobile device," "other device(s)," "user" and/or "subscriber," as used herein, may be broadly interpreted to include a device and/or a user of a device.

Generally, the term "presence," as used herein, may be considered a status of the nature of activity of a user in the context of computer or communications activity. A common example of presence is the indication provided by an on-line chat network to advise other users of a person's status, which may be "available," "online and busy," "offline," etc.

Figure 1:
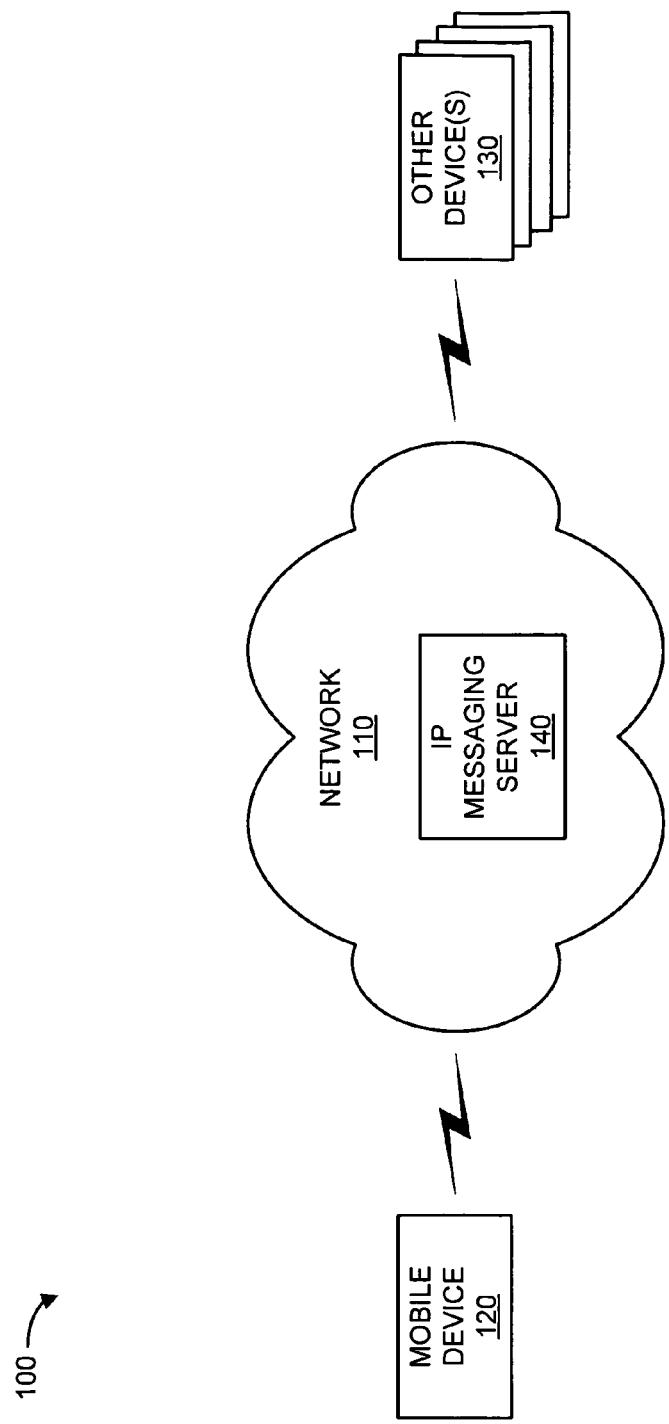
FIG. 1 depicts an exemplary network in which systems and methods described herein may be implemented.

FIG. 1 depicts an exemplary network 100 in which concepts described herein may be implemented. As illustrated, network 100 may include a network 110 interconnecting a mobile device 120 and one or more other device(s) 130. Network 110 may also include an IP messaging server 140.

Network 110 may include one or more networks including a wireless network (e.g., cellular network), a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, network 110 may include a combination of networks including a cellular network that uses components for transmitting data to and from mobile device 120, other device(s) 130, and/or IP messaging server 140. Such components may include base station antennas (not shown) that transmit and receive data from communication devices within their vicinity. Such components may also include base stations (not shown) that connect to the base station antennas and communicate with other equipment, such as switches and routers (not shown) in accordance with known techniques.

Mobile device 120 may include a device capable of transmitting and receiving data (e.g., voice, text, images, and/or multimedia data) over a wireless network. For example, mobile device 120 may include a handheld device, such as a cellular telephone, an Internet protocol (IP) telephone, a personal digital assistant (PDA); a portable game and/or music playing device; and/or a conventional laptop and/or palmtop receiver or other appliance that includes a radiotelephone transceiver with TCP/IP capabilities. In one implementation, mobile device 120 may communicate via packet based or non-packet based wireless transmissions.

In an implementation, mobile device 120 may include hardware or software based logic to maintain a TCP/IP-based messaging client application (e.g., a mobile IM application).

The messaging client application may display on mobile device 120 presence information for contacts of mobile device 120 user, including (for example) presence information for users of other device(s) 130. The messaging client application may also cause mobile device 120 to send presence information to IP messaging server 140 for distribution to the contacts of the user of mobile device 120.

Other device(s) 130 may each include any type of conventional device that is able to communicate via a network. For example, other device(s) 130 may include any type of device that is capable of transmitting and receiving data (e.g., voice, text, images, multimedia data) to/from network 110. In an exemplary implementation, other device(s) 130 may include a mobile device similar to mobile device 120. In another exemplary implementation, other device(s) 130 may include a desktop computer or other fixed-location computing device. Other device(s) 130 and/or IP messaging server 140 may connect to one or more network 110 via wired and/or wireless connections.

In an implementation, other device(s) 130 may include hardware or software based logic to maintain a TCP/IP-based client messaging application, such as an IM client application that may be used, for example, to communicate with mobile device 120. Similar to the messaging client application of mobile device 120, other device(s) 130 may send presence information to and/or receive presence information from other contacts, such as the user of mobile device 120.

IP messaging server 140 may include one or more entities that gather, process, search, and/or provide information in a manner described herein. IP messaging server 140 may provide messaging services to facilitate messages between mobile device 120 and other device(s) 130. For example, in one implementation, IP messaging server 140 may facilitate instant messages (IM) or multi-media messaging service (MMS) services over a proprietary interface and/or protocol. IP messaging server 140 may include a variety of infrastructure components to store and disseminate information regarding subscribers of the IM and/or MMS services, including, for example, databases and servers that support IP messaging services.

As shown in FIG. 1, mobile device 120 may exchange information with IP messaging server 140 via a TCP/IP connection over network 110. In one implementation, IP messaging server 140 may retrieve and send presence information of multiple subscribers. Since presence information changes frequently, IP messaging server 140 may not send the presence information in real time to subscribers (such as mobile device 120 and/or other device(s) 130) to minimize impact on network 110 resources. In one implementation, presence information may be stored on a memory within IP messaging server 140 and may be passed to mobile device 120 automatically if at least a particular time interval ("T") has elapsed since the last presence update as long as the user is actively using the client messaging application of mobile device 120. "T" may generally represent the frequency of presence updates sent from mobile device 120 to IP messaging server 140. A presence information update may also occur if a user of mobile device 120 and/or other device(s) 130 manually requests a presence update or when server piggy-backs presence information on mobile-terminated messages. A user may be considered to be actively using the client messaging application of mobile device 120 whenever the user enters the client messaging application or presses a key while the client messaging application is open. Automatic presence updates may enhance the user's experience, since presence information displayed on, for example, mobile device 120 is more likely to be accurate. However, automatic presence updates can require IP messaging server 140 to have additional capacity to handle these updates in addition to regular messaging traffic during peak hours.

Generally, after extended idle period, a wireless network within network 110 may release communication resources within network 110 that were assigned to mobile device 120, including, for example, an IP address. The release may help to ensure efficient resource utilization within network 110. Also, for security reasons, network 110 may restrict traffic to/from IP messaging server 140 after an extend period of inactivity. For example, neither mobile device 120 nor IP messaging server 140 may be permitted to exchange data over a previously established TCP/IP connection if an extended period of idle time (e.g., 300 seconds) has elapsed. When a TCP connection is closed by an element within network 110, mobile device 120 and/or IP messaging server 140 may continue to attempt to send data over the TCP connection until an error message is generated as a result of an unsuccessful transmission. Mobile device 120 and/or IP messaging server 140 may not establish a new TCP connection until the error message is received. This scenario may result in a poor user experience. Also, IP messaging server 140 may be restricted from initiating a TCP connection—only mobile device 120 may be allowed to initiate the TCP connection.

In implementations described herein, mobile device 120 and IP messaging server 140 may use timers to detect an extended idle period over an existing TCP connection and may intentionally terminate idle TCP connections based on the timer values. In one implementation, IP messaging server 140 may then use a "wakeup" message to effectively enable a TCP connection setup initiated by IP messaging server 140 over an IP connection in a limited connectivity (e.g., not always on) wireless network. In another implementation, dynamic refresh timers may be used to vary the frequency of automatic presence updates sent from mobile device 120 to IP messaging server 140 to based on current load conditions.

Mobile device 120, other device(s) 130, and/or IP messaging server 140 may connect to one or more networks 110 via wired and/or wireless connections. One mobile device, several other devices, one IP messaging server, and one network have been illustrated in FIG. 1 for simplicity. In practice, there may be more or fewer mobile devices, other devices, IP messaging servers, and/or networks. Also, in some instances, one or more of network 110, mobile device 120, other device(s) 130, and/or IP messaging server 140 may perform one or more functions described as being performed by another one or more of network 110, mobile device 120, other device(s) 130, and/or IP messaging server 140.

Figure 2:
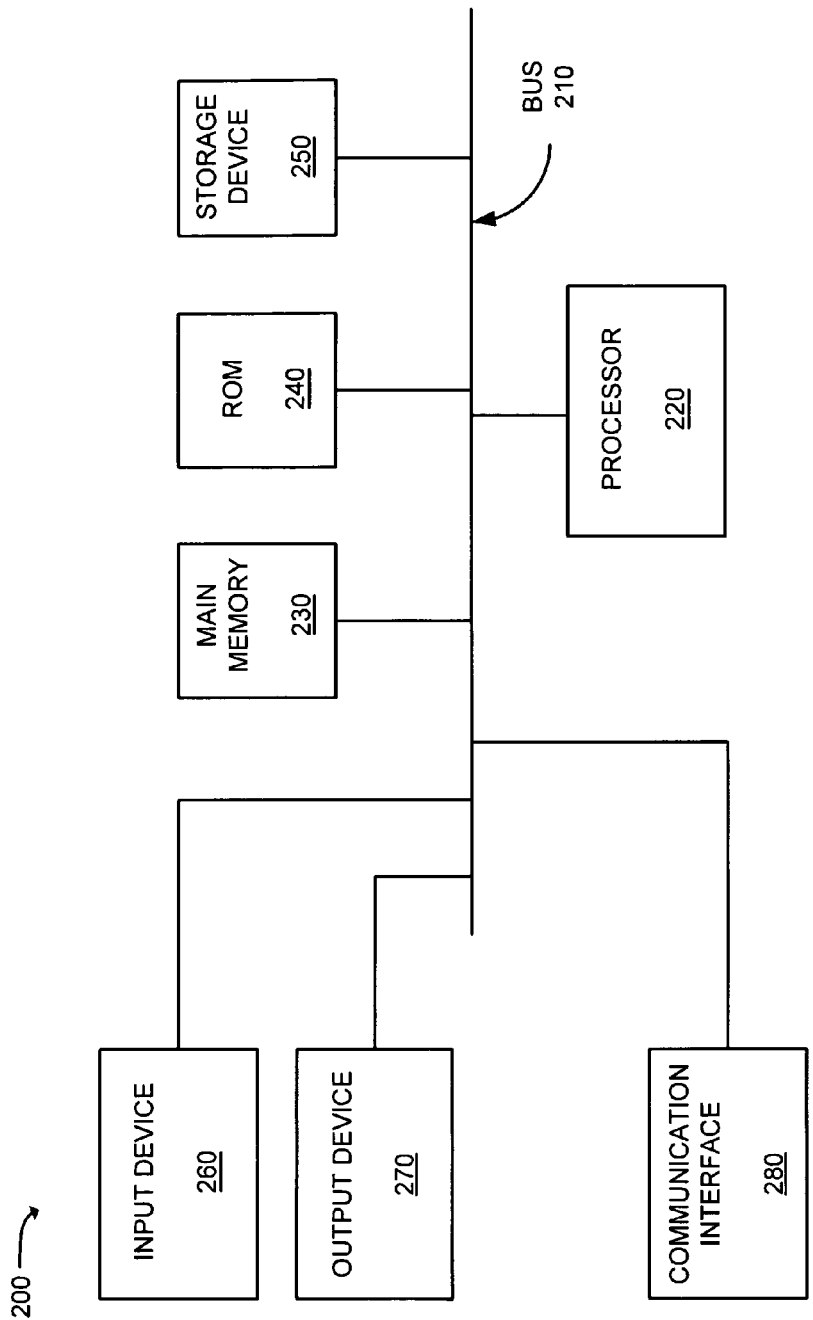
FIG. 2 is a block diagram of an exemplary device that may be used in the systems of FIG. 1.

FIG. 2 is an exemplary diagram of a device 200 that may correspond to any of mobile device 120, other device(s) 130, and/or IP messaging server 140. As illustrated, device 200 may include a bus 210, a processor 220, a main memory 230, a read only memory (ROM) 240, a storage device 250, an input device 260, an output device 270, and a communication interface 280. Bus 210 may include conductors or a pathway that permit communication among the components of device 200.

Processor 220 may include a processor(s), a microprocessor(s), or processing logic that interprets and executes instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include one or more mechanisms that permit a user to input information to device 200, such as a keyboard, a touch screen, a touch pad, a mouse, a pen, voice recognition and/or biometric mechanisms, etc. Output device 270 may include one or more mechanisms that output information to the user, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 110.

As described herein, device 200 may perform certain operations in response to processor 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of user device 200.

Figure 3:
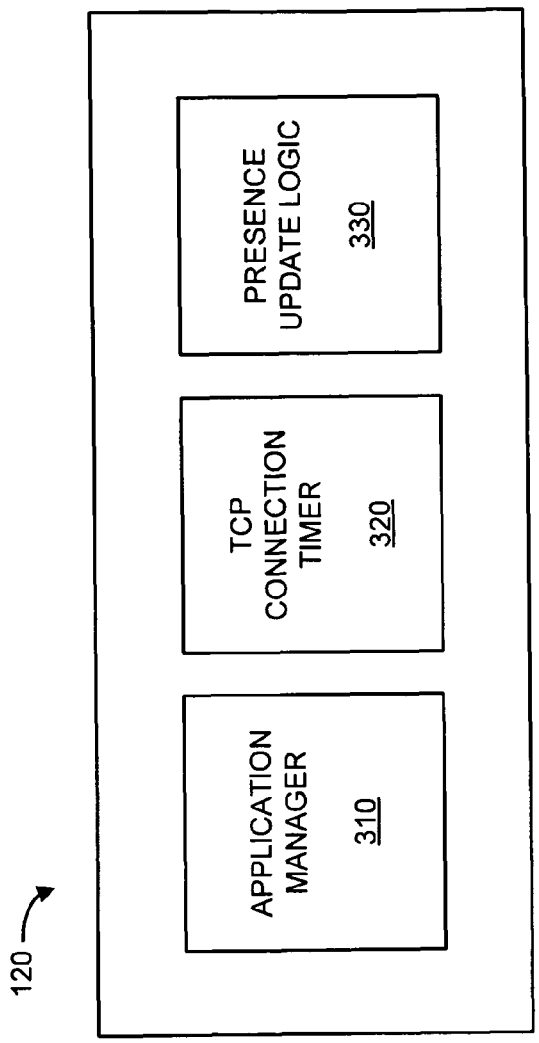
FIG. 3 is a functional block diagram of the mobile device of FIG. 1.

FIG. 3 is a functional block diagram of exemplary components of mobile device 120. As shown in FIG. 3, mobile device 120 may include an application manager 310, a TCP connection timer 320, and presence update logic 330.

Application manager 310 may include hardware- and/or software-based logic to receive and send information using IP messaging over a TCP connection. In one implementation, application manager 310 may initiate and/or terminate TCP connections with a server, such as IP messaging server 140. Application manager 310 may also provide acknowledgements to IP messaging server 140 in response to messages from IP messaging server 140. In another implementation, application manager 310 may receive instructions for automatic presence updates and presence update intervals and provide the instructions to presence update logic 330.

In one implementation, application manager 310 may also provide or trigger another component (i.e., another component either within mobile device 120 or external to mobile device 120) to provide identifiers that may provide an alternate way to communicate between IP messaging server 140 and mobile device 120 in the event a TCP connection between IP messaging server 140 and mobile device 120 is closed or unavailable. As used here, an identifier may be an address or other information to permit communication with mobile device 120 outside of a TCP connection. Exemplary identifiers for mobile device 120 may include a mobile directory number (MDN), unicast access terminal identifier (UATI), or an IP address and user datagram protocol (UDP) port.

TCP connection timer 320 may include hardware- and/or software-based logic to track idle periods for a TCP connection between mobile device 120 and a server, such as IP messaging server 140. TCP connection timer 320 may be set to a value that is less than a time period used by a wireless network to determine latent connections. In one implementation, the value of TCP connection timer may be a fixed value determined (by a network administrator, for example) based on knowledge of the wireless network components. The timer value may be provided to mobile device 120 and IP messaging server 140 as part of an initial software download. In one implementation, TCP connection timer 320 may be set to the same value as a timer on the server connected via the TCP connection (e.g., messaging server 140). In another implementation the timer value may be provided to mobile device 120 from IP messaging server 140 during initiation of a TCP session with IP messaging server 140. TCP connection timer 320 may trigger application manager 310 to close a TCP connection if the idle period for the TCP connection between mobile device 120 and the server exceeds the timer value.

Presence update logic 330 may include hardware- and/or software-based logic to send and receive presence information regarding users of mobile device 120 and/or users of other device(s) 130. In one implementation, presence update logic 330 may include a presence update timer that triggers presence update logic 330 or another component, such as application manager 310, to provide automatic presence updates to IP messaging server 140. In one implementation, the presence update timer may use a variable time interval, "T." The value of the variable time interval "T" may be supplied by, for example, IP messaging server 140 based on load conditions of the network providing the TCP connection between mobile device 120 and IP messaging server 140.

Figure 4:
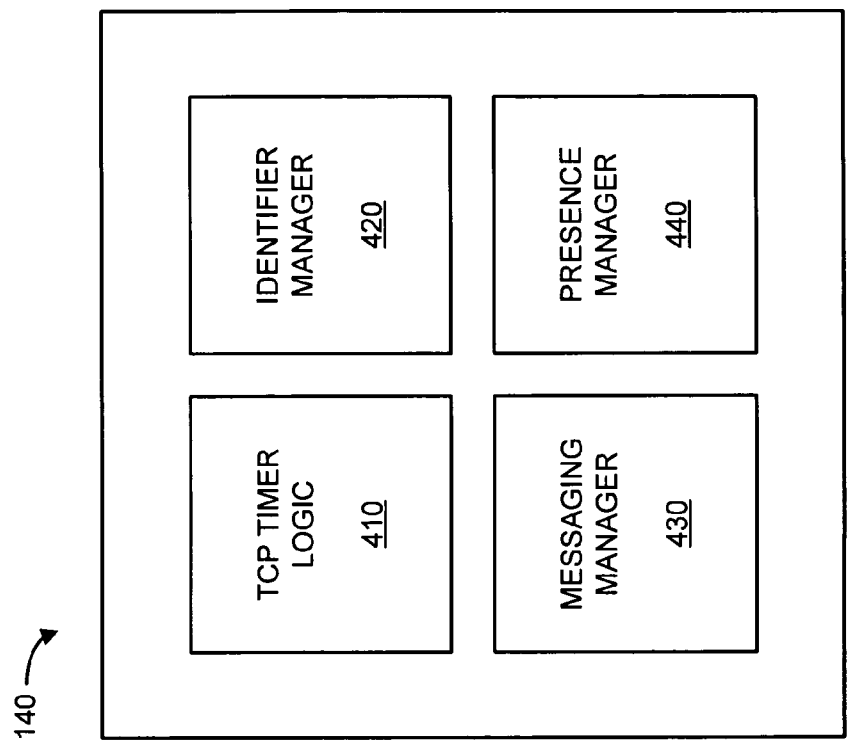
FIG. 4 is a functional block diagram of the IP messaging server of FIG. 1.

FIG. 4 is a functional block diagram of exemplary components of IP messaging server 140. As shown in FIG. 4, IP messaging server 140 may include TCP timer logic 410, an identifier manager 420, a messaging manager 430, and a presence manager 440.

TCP timer logic 410 may include may include hardware- and/or software-based logic to track idle periods for a TCP connection between IP messaging server 140 and a mobile device, such as mobile device 120. TCP timer logic 410 may include a timer value that is less than a time period used by a wireless network to determine latent TCP connections. In one implementation, the timer value for TCP timer logic 410 may be set to the same value as the timer of TCP connection timer 320. In one implementation, TCP timer logic 410 may send the timer value to mobile device 120 during initiation of a TCP session with mobile device 120. TCP timer logic 410 may trigger messaging manager 430 to close a TCP connection if the idle period for the TCP connection between mobile device 120 and IP messaging server 140 exceeds the timer value.

Identifier manager 420 may include hardware- and/or software-based logic to request, receive and store identifiers for mobile device 120. Identifier manager 420 may, for example, obtain one or more identifiers from the mobile device 120 or from another network entity during setup of the IP application session. Identifier manager 420 may associate the identifiers with mobile device 120 and store the identifiers for later use, if needed.

Messaging manager 430 may include hardware- and/or software-based logic to receive and send information using IP messaging over a TCP connection. Messaging manager 430 may also terminate a TCP connection and send indicator (e.g., "wakeup") messages to mobile device 120 (e.g., using an identifier of mobile device 120) to initiate a TCP connection. In one implementation, messaging manager may also insert user data (e.g., text messages intended to be displayed to the user) into the indicator messages.

Presence manager 440 may include hardware- and/or software-based logic to collect presence information from and distribute presence information to mobile device 120 and/or other device(s) 130. In one implementation, presence manager 440 may instruct IP applications on mobile device 120 and/or other device(s) 130 to provide automatic presence updates at particular time interval, "T." Presence manager 440 may determine a value for "T" based on load conditions of the wireless network servicing the TCP connection(s) between IP messaging server 140 and mobile device 120 and/or other device(s) 130. Depending on the network load conditions, presence manager 440 may send instructions (or trigger messaging manager 430 to send instructions) to mobile device 120 and/or other device(s) 130 change the value of "T."

Figure 5:
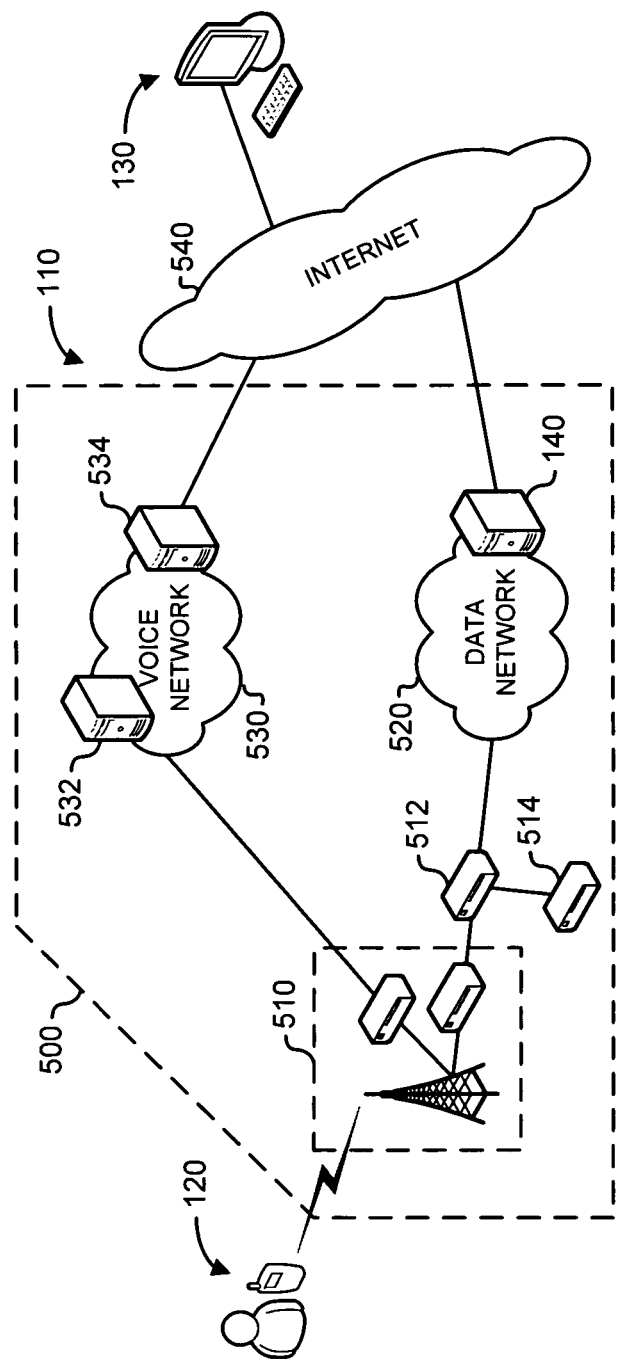
FIG. 5 is an exemplary network diagram conceptually illustrating an implementation of efficient messaging over internet protocol.

FIG. 5 is an exemplary network diagram conceptually illustrating an implementation of efficient messaging according to systems and/or methods described herein. As shown in FIG. 5, mobile device 120 and one of other device(s) 130 may be connected by network 110. Network 110 may include a series of network components including a wireless carrier network 500 and the Internet 540. Each of mobile device 120 and one of other device(s) 130 may be subscribers to an IP messaging service, such as IM or MMS.

Wireless carrier network 500 may include a network that transfers information. Wireless carrier network 500 may include a radio access network (RAN) 510, a data network 520, and a voice network 530. Implementations of wireless carrier network 500 may include cellular networks and/or other types of wireless networks, such as ad hoc wireless networks, free-space optical networks, etc. Wireless carrier network 500 may send and/or receive information via packet-based or non-packet based exchanges. In one implementation, wireless carrier network 500 may be operated by a service provider that provides wireless communication services to a customer, such as a user of mobile device 120, as a managed service (e.g., for a monthly fee). Wireless carrier network 500 may send and/or receive encrypted information and/or unencrypted information.

Radio access network 510 may include a variety of components to facilitate mobile communications, such as antennas, base transceiver stations, mobile switching centers, and interfaces with Public Switched Telephone Networks (PSTNs) and/or packet data servicing nodes (PDSNs), such as PDSN 512. PDSN 512 may serve as an access gateway to data network 520. PDSN 512 may be operatively connected to an authentication, authorization, and accounting (AAA) server 514. AAA server 514 may include a server entity that gathers, processes, searches, and/or maintains applications (e.g., a high-speed, high-capacity packet processing applications). In one implementation, AAA server 514 may provide authorization services (e.g., billing information, account information, etc.) for PDSN 512 and/or IP messaging server 140.

Data network 520 may include IP message server 140 and other components necessary to facilitate IP messaging traffic, including for example, one or more load balancers, gateways, and databases connected by a core IM infrastructure (not shown). Components in data network may have firewalls or other logical entities that may automatically shut down a TCP connection after an extended idle period.

Voice network 530 may include a Short Message Service Center (SMSC) 532 and a Short Message Peer-to-Peer (SMPP) gateway 534. SMSC 532 may include one or more devices for implementing text messaging in a mobile telephone network, such as voice network 532. If a user (e.g., using mobile device 120) sends a text message (e.g., a short message service (SMS) message) to another user (e.g., using one of other device(s) 130), the message may be received and forwarded by SMSC 523 to the destination user. SMSC 532 may generally be responsible for locating the destination user and submitting the message to the destination user.

SMPP gateway 534 may include a device that supports SMS connectivity and processes SMS messages. SMPP gateway 225 may switch messages between different SMS clients. SMPP gateway 225 may set various SMS parameters, such as, for example, data coding scheme and validity period. SMPP gateway 225 may support least cost routing and/or other types of routing features.

In the exemplary network of FIG. 5, mobile device 120 may establish a TCP connection with IP messaging server 140 to facilitate, for example, communication with one of other device(s) 130. Both mobile device 120 and one of other device(s) 130 may communicate with IP messaging server 140 to provide presence information and to deliver instant messages. Presence information from each of mobile device 120 and one of other device(s) 130 may be stored in a memory (e.g., memory 230) or database operatively connected with IP messaging server 140. Also, IP messaging server 140 may receive and store one or more identifiers for mobile device 120 that may provide an alternate way to communicate between IP messaging server 140 and mobile device 120 in the event the TCP connection between IP messaging server 140 and mobile device 120 is released. Identifiers may be provided to IP messaging server 140, for example, by mobile device 120 or by AAA server 514.

Both mobile device 120 and IP messaging server 140 may maintain timers associated with the TCP connection to track idle periods. The timer value may be less than a value used by components in network 500 to, for example, close a firewall to a previously established TCP socket. If the timer of either mobile device 120 or IP messaging server 140 expires, mobile device 120 or IP messaging server 140 may close the TCP connection on its end. After the TCP connection is closed, when either mobile device 120 or IP messaging server 140 has additional data to send, a new TCP connection may be established with recipient entity (i.e., either IP messaging server 140 or mobile device 120). Mobile device 120 may initiate this TCP connection using data network 520. To circumvent prohibitions of server-initiated sessions on data network 520, IP messaging server 140 may re-establish a new TCP connection by sending an indication (e.g., a "wakeup" message) to mobile device 120 via an alternate channel. The indication may use, for example, one of the identifiers stored by IP messaging server 140 at the beginning of the original TCP session. The indication may instruct mobile device 120 to obtain a new IP address (if required) and to establish a new TCP connection with IP messaging server 140. In one implementation, relatively small messages from IP messaging server 140 may be included with the indication sent to mobile device 120.

IP messaging server 140 may provide load-based automatic presence updates to mobile device 120 and other device(s) 130 using the TCP connection over data network 520. The automatic presence updates may be provided at a particular time interval, "T." However, a static value for T may not be suitable. For example, a low T value may result in IP messaging server 140 utilizing data network 520 capacity for presence updates during peak hours which could instead be used for serving regular messaging traffic. Conversely, a high T value may result in a user not benefiting from automatic presence updates (e.g., relatively poor user experience) during periods when IP messaging server 140 utilization is low. Thus, IP messaging server 140 may change the value of T to be used by clients based on load conditions of data network 520.

Although FIG. 5 shows exemplary components of network 110 and wireless carrier network 500, in other implementations, wireless carrier network 500 may contain fewer, different, or additional components than depicted in FIG. 5. In still other implementations, one or more components of wireless carrier network 500 may perform one or more other tasks described as being performed by one or more other components of wireless carrier network 500. For example, in one implementation, one or more functions of data network 520 and voice network 530 may be combined. Conversely, a single component may be implemented as multiple, distributed components. For example, IP messaging server 140 may be a distributed component. Further, connections between the various components may be directly made or may be indirectly made via a node, a network, or a combination thereof.

Figure 6:
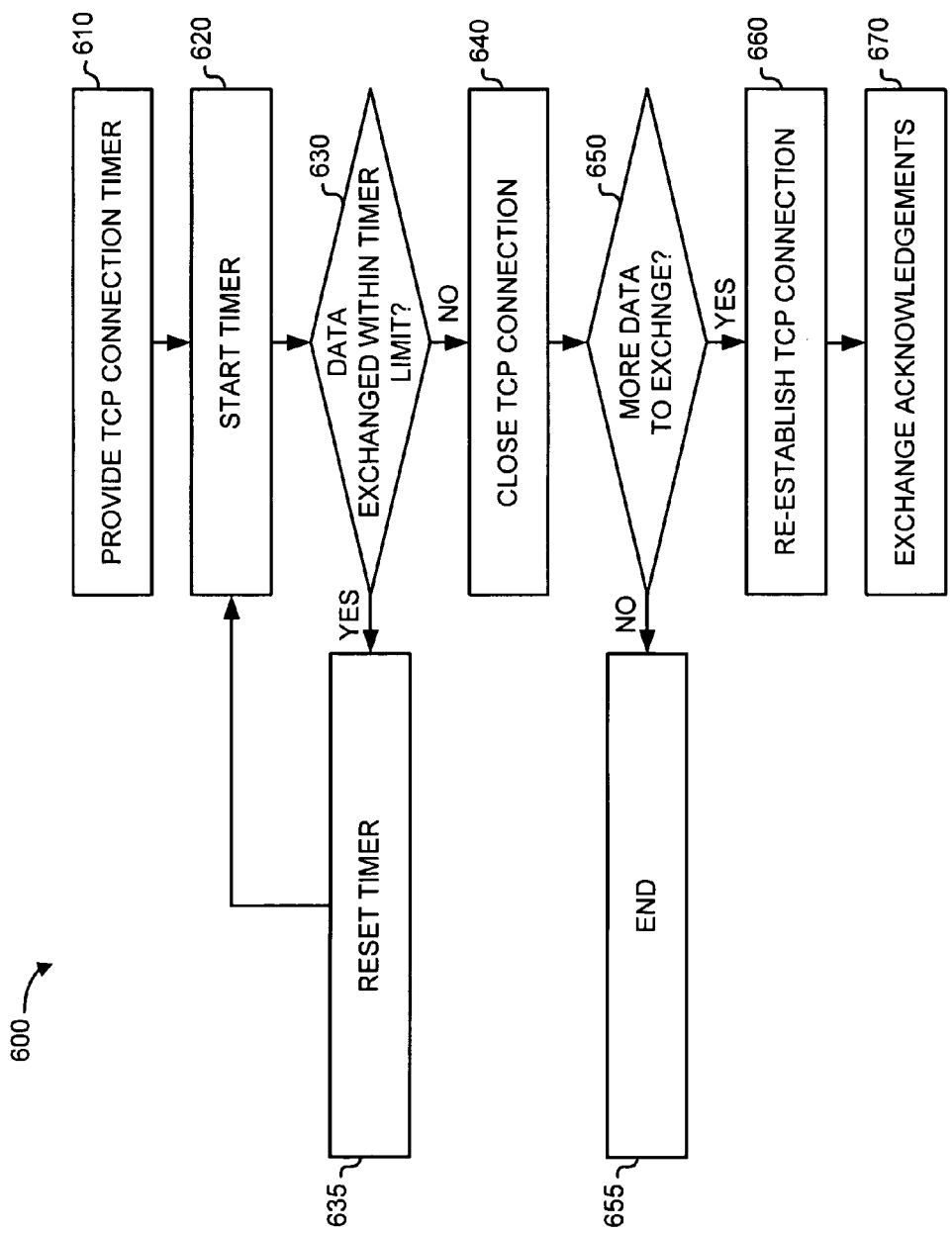
FIG. 6 is a flow chart illustrating exemplary operations that may be performed in exchanging messages over a TCP/IP connection according to an implementation.

FIG. 6 provides a flow chart of exemplary operations 600 that may be performed in exchanging messages over a TCP/IP connection according to an implementation. Operations 600 may be performed by components of a wireless carrier network, such as wireless carrier network 500. In one implementation, the operations may be performed by performed by hardware, software, or a combination of hardware and software components of a messaging server, such IP messaging server 140 and a mobile device, such as mobile device 120 running an IP application client. The process may begin when a TCP/IP connection is established between the mobile device and the messaging server.

As shown in FIG. 6, a TCP connection timer may be provided (block 610). For example, mobile device 120 and IP messaging server 140 may both maintain timers associated with a TCP connection to track idle periods. The timers may be set to the same value on mobile device 120 and IP messaging server 140. The timer value used may be less than a time period used by a network (e.g., wireless carrier network 500 and/or data network 520) to determine latent TCP connections. In one implementation, the timer value may be determined based on information from wireless carrier network 500 and/or data network 520 and sent to mobile device 120 and IP messaging server 140.

The timer may be started (block 620). For example, mobile device 120 and IP messaging server 140 may each start their respective timers when a TCP connection is established. The timers may be reset each time after data is exchanged between the IP application operating on mobile device 120 and IP messaging server 140.

It may be determined if data is exchanged within the timer limit (block 630). For example, mobile device 120 and/or IP messaging server 140 may determine, respectively, if data has been exchanged within the timer value that was set. If it is determined that data is exchanged between IP messaging server 140 and mobile device 120 within the timer limit, then the timer may be reset (block 635). For example, mobile device 120 and/or IP messaging server 140 may reset their respective timers whenever mobile device 120 and/or IP messaging server 140 determine that data was exchanged over the TCP connection. After the timer is reset, the timer may again be started (block 620).

If data is not exchanged between IP messaging server 140 and mobile device 120 within the timer limit, the TCP connection may be closed (block 640). For example, if IP messaging server 140 determines that the timer value expires, IP messaging server 140 may close the TCP connection. Similarly, if mobile device 120 determines that the timer value has expired, mobile device 120 may close the TCP connection. This ensures (for example) that neither mobile device 120 nor IP messaging server 140 may attempt to use a TCP connection if there has been extended idle time (that is, a TCP connection that be have been closed by a component within network 500).

It may be determined if there is more data to exchange (block 650). For example, mobile device 120 and/or IP messaging server 140 may identify more data to transmit over the TCP connection. If there is no additional data to exchange between the client and the server, the process may end (block 655). For example, the TCP connection between mobile device 120 and IP messaging server 140 will remain closed.

If there is additional data to exchange between the client and the server, the TCP connection may be re-established (block 660). For example, when either mobile device 120 or IP messaging server 140 has data to send, a new TCP connection may be established with the reciprocal entity (IP messaging server 140 or mobile device 120). Mobile device 120 may initiate re-establishing the TCP connection as a new session. Initiating the TCP connection from IP messaging server 140 is disclosed in more detail with respect to FIG. 7.

Acknowledgements may be exchanged (block 670). For example, mobile device 120 and IP messaging server 140 may re-establish the TCP connection based on message acknowledgements. Mobile device 120 and IP messaging server 140 may be required to acknowledge each message sent by the other entity (e.g., mobile device 120 or IP messaging server 140). In one implementation, the sender of the message may use acknowledgements to detect problems with the TCP connection and re-establish the TCP connection, if necessary.

Figure 7:
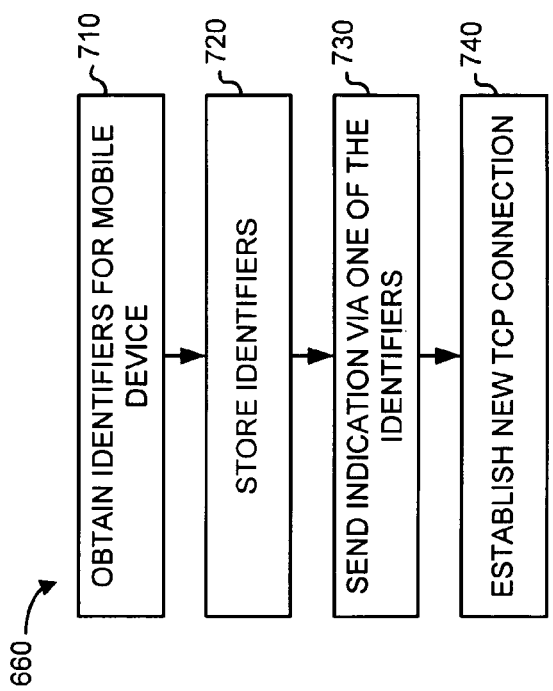
FIG. 7 is a flow chart illustrating exemplary operations that may be performed in the re-establishing of a TCP connection of FIG. 6.

FIG. 7 provides a flow chart of exemplary operations that may be performed in the re-establishing of a TCP connection in block 660 of FIG. 6. In one implementation, the operations may be performed by performed by hardware, software, or a combination of hardware and software components of a messaging server, such IP messaging server 140. In other implementations, the operations may be performed by hardware, software, or a combination of hardware and software components of IP messaging server 140, such as messaging server 140, in combination with hardware, software, or a combination of hardware and software components of another device (e.g., communicating with messaging server 140 via communication interface 280).

Identifiers for a mobile device may be obtained (block 710). For example, IP messaging server 140 may obtain identifiers (e.g., a mobile directory number (MDN), a unicast access terminal identifier (UATI), or an IP address and UDP port) from mobile device 120 or from another network entity (e.g., AAA server 514) during the TCP/IP application session setup. In one implementation, an IP address could be used in the case where mobile device 120 is an 'always-on' type device which always has an IP address assigned. Such a mobile device could have a UDP port listening for an indication from IP messaging server 140.

The identifiers may be stored (block 720). For example, IP messaging server 140 may store in memory (e.g., main memory 230 and/or storage device 250) the other identifiers associated with mobile device 120.

An indication may be sent via one of the identifiers (block 730). For example, IP messaging server 140 may request a TCP re-establishment by sending an indication (e.g., a "wakeup" message) to mobile device 120 via an alternate channel corresponding to one of the identifiers. If IP messaging server 140 has data to send to mobile device 120 and no TCP connection exists, or data transfer over an existing TCP connection is unsuccessful, then IP messaging server 140 may utilize an identifier to send an indication to mobile device 120. For example, the indication may be sent over an alternate channel that does not restrict server initiated messages/traffic. Examples may include: an SMS message, a UDP push, or the messaging server sending an indication to an intermediate entity (e.g., an evolution-data optimized (EVDO) session manager or an access network base station controller (AN/BSC) which in turns sends the indication to mobile device 120 using a UATI assigned to mobile device 120.

The indication may instruct mobile device 120 to forward the indication to a client application running on mobile device 120 and may instruct the client application to obtain a new IP address (if required) and then establish a new TCP connection with IP messaging server 140. In one implementation, if the data/message that IP messaging server 140 has pending for the client application is sufficiently small then the data/message may be included in the indication sent to mobile device 120. Thus, a user may be able to view the message more quickly by not having to wait for the TCP re-establishment to be completed.

A reply to TCP connection may be established (block 740). For example, on receiving the indication, from IP messaging server 140, mobile device 120 may obtain a new IP address (if necessary) and establish a new TCP connection with IP messaging server 140, which is then able to send data pending for mobile device 120.

Figure 8:
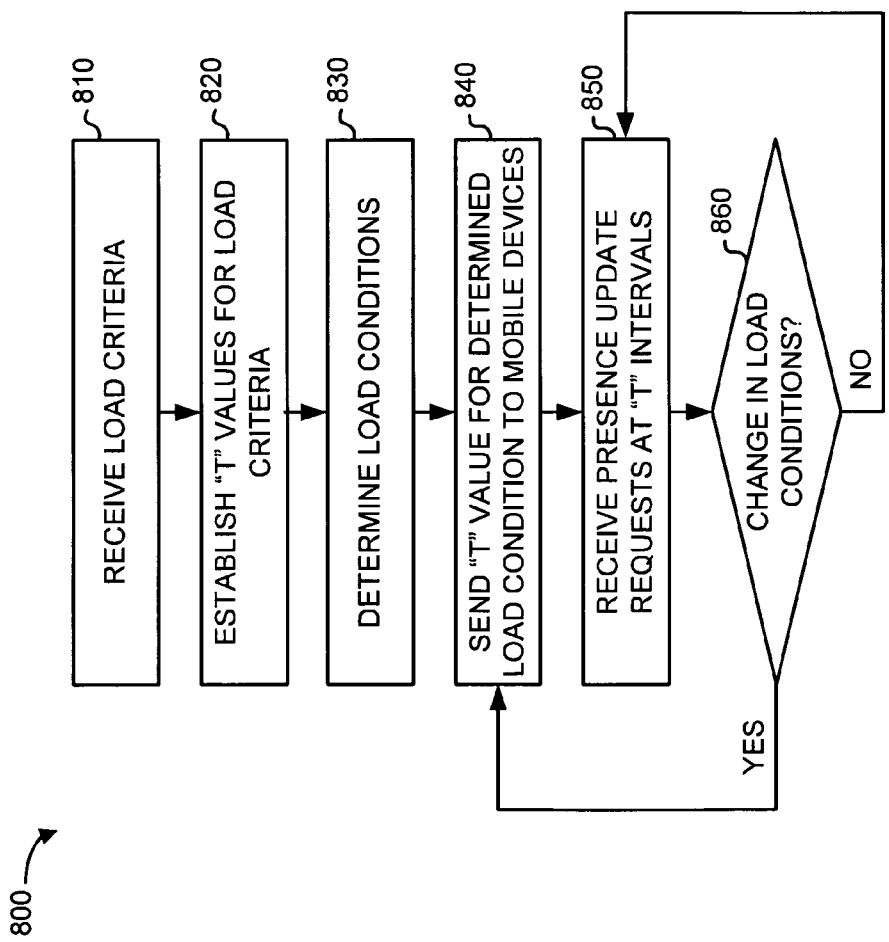
FIG. 8 is a flow chart illustrating exemplary operations that may be performed in providing a dynamic refresh timer based on resource availability according to an implementation.

FIG. 8 provides a flow chart of an exemplary process 800 that may be performed in providing a dynamic refresh timer based on resource availability. In one implementation, the operations may be performed by performed by hardware, software, or a combination of hardware and software components of messaging server 140. In other implementations, the operations may be performed by hardware, software, or a combination of hardware and software components of messaging server 140 in combination with hardware, software, or a combination of hardware and software components of another device (e.g., communicating with messaging server 140 via communication interface 280).

Load criteria may be received (block 810). For example, messaging server 140 may receive peak and off-peak load criteria from a component of wireless carrier network 500. In one implementation, the peak and off-peak criteria may include particular time ranges when network activity is expected to be high (e.g., peak load) based on historical data. In another implementation, the peak and off-peak criteria may include a threshold number or other value of network activity to identify peak conditions. In another implementation, load criteria may be divided into more than two (i.e., peak and off-peak) ranges. For example, load criteria may be categorized as "low," "medium" or "high."

"T" values for the load criteria may be established (block 820). For example, messaging server 140 may establish particular time intervals ("T") that mobile devices, such as mobile device 120, should use during when particular load conditions exist. Generally, T value for peak load periods may be greater (i.e., requiring less frequent updates from each mobile device) than for off-peak periods. In one implementation, T values for each load criteria may be provided to messaging server 140 from another component of wireless carrier network 500.

Load conditions may be determined (block 830). For example, messaging server 140 may determine the load conditions of data network 520 based on the load criteria. In one implementation, load conditions may be determined based on time-based load criteria, such as the time of day in relation to the time period defining peak load conditions. In another implementation, load conditions may be determined based on usage criteria, such as the level of network activity compared to a peak load threshold.

The "T" value for the determined load condition may be sent to the client (block 840). For example, messaging server 140 may associate a particular T value with the load condition and send the T value to mobile device 120s. Changes to the T value may be sent to mobile device 120 using existing message types such as, for example, mobile terminated messages or refresh list response messages. During peak hours messaging server 140 may send a higher T value to reduce load due to automatic presence updates. During low traffic periods messaging server 140 may decrease the T value so that users can benefit from more frequent updates that can be supported by unused network capacity.

Presence update requests may be received at T intervals (block 850). For example, messaging server 140 may receive presence update requests from mobile device 120 at the requested T intervals while monitoring the load conditions. Messaging server 140 may respond to the presence update requests with updated presence information. It may be determined if a change in load conditions occurs (block 860). For example, messaging server 140 may determine (or receive information indicating) that load conditions for the network have changed beyond the load criteria associated with the currently T value. If messaging server 140 determines the load conditions require a new T value, the process may return to block 840 to send to mobile device 120 a new T value for the determined load conditions. If messaging server 140 determines there is no change in the load conditions, then the process may return to block 850 to continue to receive presence update requests.

FIG. 9 provides an exemplary data structure 900 for an indication that may be sent by messaging server 140 to mobile device 120, as described, for example, in block 730 of FIG. 7. The indication may be in the form of an SMS wake-up message. Among other information, data structure 900 may include a "protocol identifier, data coding scheme, time stamp" section 910 and a "user data" section 920. A data coding scheme field within "protocol identifier, data coding scheme, time stamp" section 910 may be used to facilitate a wake-up message to mobile device 120. For example, a 'Class 0' indication used in the data coding sequence field may be used to request immediate display/alert by mobile device 120 and to indicate no storage is required on mobile device 120.

The user data section 920 may be used to indicate a particular client application on mobile device 120 to which the SMS message is directed. In the example of FIG. 9, "user data" section 920 may include the string "//BREW:0xABCDEFGH," where the "//BREW" prefix may indicate the SMS message is directed at a BREW (Binary Runtime Environment for Wireless) application registered on mobile device 120, and "0xABCDEFGH" may indicate a class identification. In an implementation, "user data" block 920 may also contain actual user data, such as messaging text for presentation to a user.

FIG. 10 provides another exemplary data structure 1000 for an indication that may be sent by messaging server 140 to mobile device 120, as described, for example, in block 730 of FIG. 7. The indication may be in the form of a wireless application protocol (WAP) push wake-up message sent via, for example, a UDP broadcast. Among other information, data structure 1000 may include a content type section 1010 and an application identification section 1020. In the example of FIG. 10, the string "application/vnd.wv.csp.cir" in section 1010 includes the content type indicator "cir" that may be used to indicate section 1010 includes a correction initiation request. In section 1020, an application identification string may be used to identify the application client on mobile device 120 to which the WAP push message applies.

Methods and systems described herein may provide for a mobile device and/or a messaging server measuring a time interval for an idle period during a TCP connection between the mobile device and the messaging server. The idle period may be less than the time period to trigger an automatic closing of an idle TCP connection within the network. Either the messaging server or the mobile device may close the TCP connection if data is not exchanged within the time interval, and either the messaging server or the mobile device may re-establish the TCP connection of additional data needs to be exchanged. The messaging server may also determine a load condition for the network and send, to the mobile device, a value for a frequency of automatic presence updates based on the determined load condition for the network.

The foregoing description provides illustration and description, but is not intended to be exhaustive or to limit the embodiments to the precise form disclosed. Modifications and variations are possible in light of the above teachings or may be acquired from practice of systems and methods disclosed herein.

Also, while series of blocks have been described with regard to the flowcharts of FIGS. 6, 7, and 8, the order of the blocks may differ in other implementations. Further, non-dependent acts may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
receiving, by a server, information that indicates that a Transmission Control Protocol (TCP) connection is established by a mobile device between the mobile device and the server;
starting, by the server, a timer when data is sent over the TCP connection that is established by the mobile device;
receiving, by the server and from the mobile device, an identifier to allow the server to communicate with the mobile device via an alternate channel that is different from the TCP connection after the TCP connection established by the mobile device is closed,
the identifier being received by the server from the mobile device via the TCP connection established by the mobile device;
determining, by the server and based on the timer, that new data is not sent within a first particular time period,
the first particular time period being less than a second particular time period that is used to detect latent TCP connections;
closing, by the server, the TCP connection established by the mobile device based on the server determining that new data is not sent within the first particular time period;
determining, by the server and after the server closes the TCP connection established by the mobile device, that the server has additional data for the mobile device;
sending, by the server and based on the identifier, an indicator to the mobile device via the alternate channel after determining that the server has the additional data for the mobile device,
the indicator including instructions for the mobile device to establish a new TCP connection with the server; and
sending, by the server and via the new TCP connection, the additional data to the mobile device after the mobile device establishes the new TCP connection based on the indicator.

2. The method of claim 1, where the identifier includes one of a mobile directory number (MDN) or a unicast access terminal identifier (UATI).

3. The method of claim 1, where sending the indicator includes:
sending the indicator by using a short message service (SMS) or a user datagram protocol (UDP).

4. The method of claim 1, where the identifier includes an Internet Protocol (IP) address and information identifying a user datagram protocol (UDP) port associated with the mobile device.

5. The method of claim 1, further comprising:
determining that a size of a particular portion of the additional data is less than a particular threshold; and
including, before sending the indicator and after determining that the size of the particular portion is less than the particular threshold, the particular portion in the indicator.

6. A system comprising:
one or more processors to:
receive information that indicates that a Transmission Control Protocol (TCP) connection is established by a mobile device between the mobile device and the system;
receive, from the mobile device, an identifier via the TCP connection that is established by the mobile device,
the identifier including information to permit the system to communicate with the mobile device via an alternate channel that is outside of the TCP connection after the TCP connection established by the mobile device is closed;
send data to the mobile device over via the TCP connection;

measure an idle time while the TCP connection is active based on the sending of the data;
determine that the idle time is greater than a particular time period;
close the TCP connection established by the mobile device after determining that the idle time is greater than the particular time period;
determine, after closing the TCP connection established by the mobile device, that the system has additional data for the mobile device; and
send, based on the identifier and via the alternate channel, an indicator to the mobile device to initiate establishing a new TCP connection between the system and the mobile device after determining that the system has the additional data for the mobile device.

7. The system of claim 6, where the identifier includes one of a mobile directory number (MDN), a unicast access terminal identifier (UATI), or an Internet Protocol (IP) address and information identifying a user datagram protocol (UDP) port.

8. The system of claim 6, where, when sending the indicator, the one or more processors are to:
send the indicator by using a short message service (SMS) or a user datagram protocol (UDP).

9. The system of claim 6, where the particular time period is a fixed value.

10. The system of claim 6, where the indicator includes:
instructions for the mobile device to establish the new TCP connection, and
data to be displayed to a user of the mobile device.

11. A method comprising:
receiving, by a server, information that indicates that a Transmission Control Protocol (TCP) connection is established by a mobile device between the mobile device and the server;
receiving, by the server, an identifier from the mobile device via the TCP connection that is established by the mobile device,
the identifier allowing the server to communicate with the mobile device via an alternate channel that is different from the TCP connection after the TCP connection established by the mobile device is closed;
measuring, by the server, an idle time period based on data sent between the server and the mobile device while the TCP connection is active;
closing, by the server, the TCP connection established by the mobile device when the idle time period is greater than a particular time interval;
determining, by the server and after the server closes the TCP connection established by the mobile device, that the server has additional data for the mobile device; and
sending, by the server and based on the identifier, an indication to the mobile device via the alternate channel after determining that the server has the additional data for the mobile device,
the indication including instructions for the mobile device to establish a new TCP connection with the server.

12. The method of claim 11, where sending the indication includes one of:
sending the indication via a short message service (SMS) by using a mobile directory number (MDN) associated with the mobile device, or
sending the indication via an intermediate entity that forwards the indication by using a unicast access terminal identifier (UATI) associated with the mobile device.

13. The method of claim 11, where the indication further includes data to be displayed to a user of the mobile device.

14. A non-transitory computer-readable medium storing instructions, the instructions comprising:
one or more instructions that, when executed by at least one processor of a system, cause the at least one processor to:
receive information that indicates that a Transmission Control Protocol (TCP) connection is established by a mobile device between the mobile device and the system;
receive an identifier from the mobile device via the TCP connection that is established by the mobile device,
the identifier allowing the system to communicate with the mobile device via an alternate channel that is different from the TCP connection after the TCP connection established by the mobile device is closed;
determine an idle time period based on data sent between the system and the mobile device via the TCP connection;
close the TCP connection established by the mobile device when the idle time period is greater than a particular time period;
determine that the system has additional data for the mobile device after closing the TCP connection established by the mobile device;
send, based on the identifier, an indicator to the mobile device via the alternate channel after determining that the system has the additional data for the mobile device,
the identifier commanding the mobile device to establish a new TCP connection with the system; and
send the additional data to the mobile device via the new TCP connection after the mobile device establishes the new TCP connection based on the indicator.

15. The non-transitory computer-readable medium of claim 14, where the identifier includes an Internet Protocol (IP) address and information identifying a user datagram protocol (UDP) port associated with the mobile device.

16. The non-transitory computer-readable medium of claim 14, where the indicator includes instructions for the mobile device to obtain a new Internet Protocol (IP) address and to use the new IP address to establish the new TCP connection with the system.

17. The non-transitory computer-readable medium of claim 14, where the instructions further comprising comprise:
one or more instructions that, when executed by the at least one processor, cause the at least one processor to:
determine whether a size of the additional data is less than a particular threshold; and
include the additional data in the indication when the size of the additional data is less than the particular threshold.

* * * * *